(12) United States Patent
Nigrin et al.

(10) Patent No.: US 6,494,287 B2
(45) Date of Patent: Dec. 17, 2002

(54) STEERING DEVICE WITH MEASURED VALUE TRANSMITTER

(75) Inventors: Anke Nigrin, Lohr (DE); Winfried Tschöp, Kreuzwertheim (DE); Martin Kreuzer, Kleinwallstadt (DE); Hans-Jürgen Bossler, Münster (DE); Ulrich Randau, Villingen-Schwenningen (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/785,850

(22) Filed: Feb. 16, 2001

(65) Prior Publication Data

US 2001/0007294 A1 Jul. 12, 2001

Related U.S. Application Data

(62) Division of application No. 09/297,726, filed as application No. PCT/EP98/05644 on Sep. 4, 1998, now Pat. No. 6,227,327.

(30) Foreign Application Priority Data

Sep. 6, 1997 (DE) .......................................... 197 39 104

(51) Int. Cl.$^7$ ................................................ B62D 5/00
(52) U.S. Cl. ........................ 180/402; 74/552; D12/176
(58) Field of Search ................................ 180/443, 446, 180/402, 6.28; 280/771; 74/552; D12/176, 175

(56) References Cited

U.S. PATENT DOCUMENTS

| | | | | |
|---|---|---|---|---|
| D135,167 S | * | 3/1943 | Obszarny et al. | D12/175 |
| D138,079 S | | 4/1944 | Drew | D71/1 |
| D157,004 S | * | 2/1950 | Schindler | D12/175 |
| D200,614 S | * | 3/1965 | Downing | D12/175 |
| 4,421,960 A | * | 12/1983 | Arima et al. | 200/61.54 |
| 4,549,627 A | | 10/1985 | Takeshima et al. | 180/142 |
| 4,940,234 A | | 7/1990 | Ishida et al. | 273/1 GA |
| 5,086,870 A | | 2/1992 | Boldue | 180/333 |
| 5,465,632 A | * | 11/1995 | Oki et al. | 74/493 |
| D406,804 S | * | 3/1999 | Sacco et al. | D12/175 |
| 5,896,942 A | | 4/1999 | Bohner et al. | 180/402 |
| 6,041,882 A | | 3/2000 | Bohner et al. | 180/402 |
| 6,049,288 A | * | 4/2000 | Kawasaki | 340/815.4 |
| 6,226,570 B1 | * | 5/2001 | Hahn | 701/1 |

* cited by examiner

Primary Examiner—Anne Marie Boehler
Assistant Examiner—Tony Winner
(74) Attorney, Agent, or Firm—Tarolli, Sundheim, Covell, Tummino & Szabo L.L.P.

(57) ABSTRACT

A steering device for a motor vehicle includes an actuating member for the introduction of the steering movement and a steering linkage to transfer the steering movement to the vehicle wheels. The actuating member consists of a steering wheel (1) which is rotatable about a small angle and of a measured value transmitter (2) to generate an electrical or electronic position signal. The steering linkage is actuated by an adjustment drive which is controllable by an electrical regulating device as a function of the position signal.

5 Claims, 2 Drawing Sheets

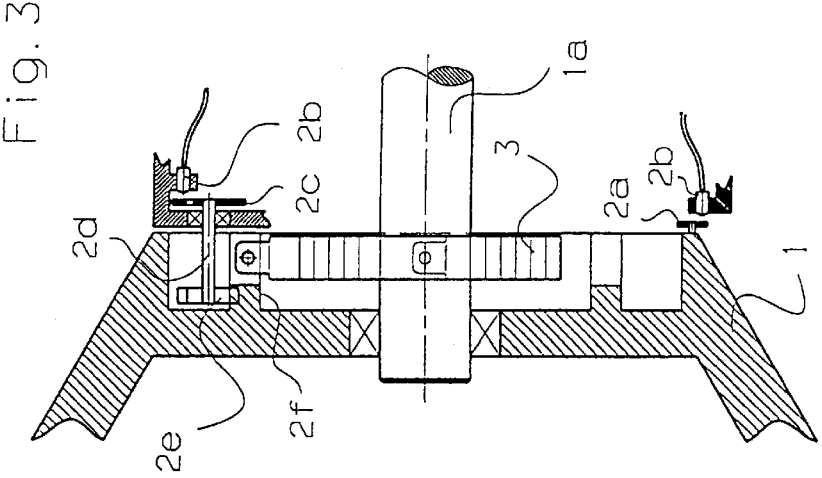
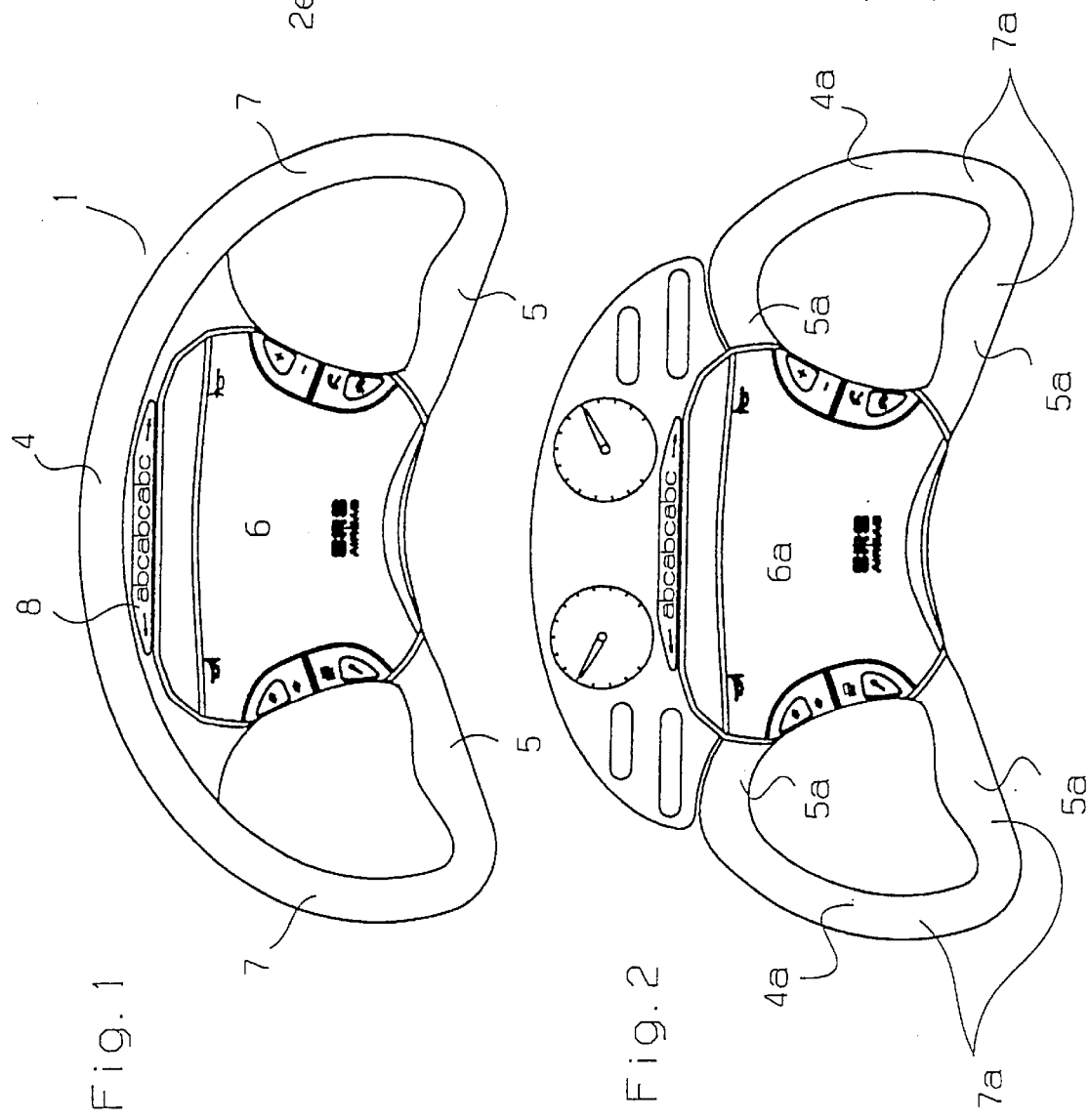

STEERING DEVICE WITH MEASURED VALUE TRANSMITTER

This application is a divisional of application Ser. No. 09/297,726, filed on May 6, 1999 and now U.S. Pat. No. 6,227,327 which is a 371 of PCT/EP98/05644 filed Sep. 4, 1998.

The invention relates to a steering device for a motor vehicle with an actuating member for the introduction of the steering movement and with a steering linkage to transfer the steering movement to the wheels.

The known steering devices consist of a steering wheel which is rotatable by hand, which can be turned from stop to stop usually 3.5 to 4.5 revolutions and the rotary movement of which is transferred via a steering gear mechanically directly to a steering linkage, which brings about the angle of deflection of the steered wheels. Such steering devices have been in use in various forms since the start of the development of automobiles, more revolutions from stop to stop also being able to be provided in buses and lorries, apart from a larger diameter of the steering wheel, in order to improve the transmission ratios in favour of less expenditure of energy. In addition, in particular in passenger cars with front wheel drive, pneumatic steering aids are widely used as so-called power-assisted steering mechanisms.

The direct mechanical coupling between the steering wheel and the steered wheels indeed also has various disadvantages. Firstly, it can not be entirely avoided that unevenness in the roadway, despite intercalated damping devices, is transmitted as far as to the steering wheel as vibrations of greater or lesser intensity, which is not only uncomfortable but also leads to greater fatigue on longer journeys. A further disadvantage consists in that in the design of such steering devices from the outset a decision has to be made for a particular transmission ratio, in which one person finds fault with an insufficient contact with the roadway, whereas for another the same transmission ratio still requires too much power. In addition, the different requirements in driving straight ahead on the motorway on the one hand and when parking on the other hand can not be satisfactorily fulfilled in the conventional steering devices or can only be fulfilled with considerable technical expenditure.

In addition to this is the fact that in modern steering wheels, increasingly more actuating devices are arranged so that they can be reached without the hand having to be taken from the steering wheel. In conventional steering devices, the reliability of such actuations depends on the fact that the individual commands can be transferred reliably from the rotatable steering wheel to fixed parts of the bodywork. Also for this a whole range of proven technical solution possibilities in fact already exists, which, however, all have the remainder of a liability to breakdown and many of which are overloaded in the case of distinct increase to the actuating devices accommodated on the steering wheel.

The problem therefore exists of indicating a steering device of the type initially mentioned, in which the above-mentioned disadvantages can not occur, which can be easily adapted to the most varied of requirements and in which a plurality of levers and keys for the most varied purposes can be readily arranged on the actuating member, without the signal transmission presenting difficulties.

To solve this problem, a generic steering device is proposed, which is characterized in that the actuating member consists of a "steering wheel" rotatable about a small angle and of a measured value transmitter to generate an electrical or electronic position signal, and that the steering linkage is actuated by an adjustment drive, which is controllable by an electrical or electronic regulating device as a function of the position signal.

In the steering device according to the invention, the term "steering wheel" was continued to be used, although the actuating member is only still rotatable about a very small angle. Otherwise, however, it can be constructed largely as a conventional steering wheel. The mechanical uncoupling from the steering linkage and the transmission of the steering commands electrically or electronically is important. For this, a measured value transmitter is provided for generating an electrical position signal, which is supplied to an electrical or electronic regulating device, which in turn generates control commands, as a function of the position signal, for an adjustment drive which actuates the steering linkage.

The steering device according to the invention has the advantage that in the "steering wheel" which is only slightly rotatable, in a conventional manner an airbag and also actuating and display devices can be accommodated, without, as in a steering wheel which is rotatable several times through 360°, particular devices having to be provided for the transmission of the actuating or display signals from a fixed component to a component which is movable through several revolutions or vice versa.

The steering device according to the invention has in addition the great advantage that as a result of the mechanical uncoupling, in a very simple manner any desired transmission ratios can be realized, because in this respect one only has to take action on the software of the electronic regulating device. Moreover, it is readily possible to select a very direct transmission ratio for driving straight ahead on the motorway and to provide the opposite design range for parking operation.

Expedient developments of the idea of the invention are described in sub-claims 2 to 18. Further details are explained more fully with the aid of the example embodiments illustrated in FIGS. 1 to 4, in which:

FIG. 1 shows a top view onto a first embodiment of the "steering wheel" for a steering device according to the invention;

FIG. 2 shows a top view onto a second embodiment of the "steering wheel" for a steering device according to the invention;

FIG. 3 shows a partial section through a steering wheel of the steering device according to the invention;

Figure 4:
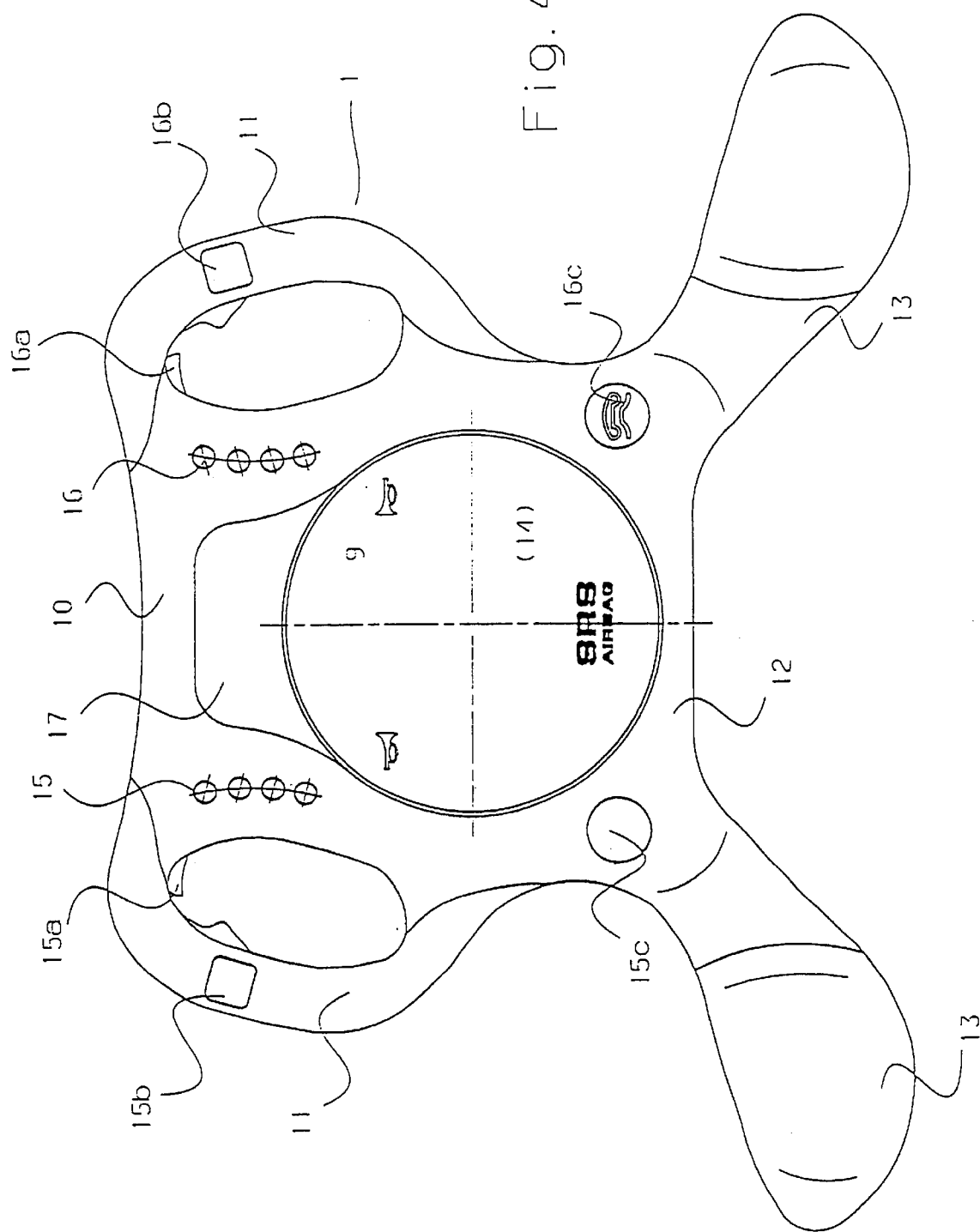
FIG. 4 shows a top view onto a further embodiment of a "steering wheel" of the steering device according to the invention.

In FIG. 1 a "steering wheel" deviating from the conventional shape is illustrated, which only consists of an approximately semicircular steering wheel rim piece 4 and two steering wheel spokes 5 which are connected externally with the ends of the steering wheel rim piece 4. Two grip regions 7 are constructed on the steering wheel rim 4 which—unlike on a rotatable steering wheel—can be grasped permanently, because only a small rotation angle of up to a maximum of approximately ±30 degrees of angle is provided. In the central part 6 of the "steering wheel" 1, an airbag can be accommodated in a conventional manner. The upper steering wheel rim piece 4 is connected with the central part 6 in the middle region 8. In addition, various display and actuating devices can be accommodated in the central part 6.

In the embodiment according to FIG. 2, the "steering wheel" 1 consists of four spokes 5a and two short steering wheel rim pieces 4a, which are connected on the end face with the outer ends of the spokes 5a and each form a grip region 7a having at least a hand's width. The spokes 5a extend from a central part 6a of the steering wheel 1, in which again an airbag can be accommodated and on which various display and actuating devices can be arranged.

According to FIG. 3 the "steering wheel" 1 is rotatably mounted on a shaft 1a, a restoring spring providing for it to automatically assume its central position. The measured value transmitter 2 can consist of a bar code carrier 2a rotating with the "steering wheel" 1, which in cooperation with a stationary reading device generates the necessary position signal.

The measured value transmitter can, however, also consist of a small, rotatable disc 2c with a bar code and of a stationary reading device 2b, the disc 2c being arranged on a shaft 2d for joint rotation therewith, the shaft 2d having a cogwheel 2e the teeth of which engage into a toothed rim 2f rotating with the "steering wheel" 1. In this way, one can influence the resolution of the bar code.

In the embodiment according to FIG. 4 finally provision is made that the "steering wheel" 1 can only perform very small rotary movements in the range of up to a maximum of ±10 degrees of angle, it being returned again by a restoring spring into the neutral central position in so far as no other external forces act on the "steering wheel" 1. The "steering wheel" 1 consists again of a central part 9 on which in the upper region 10 grip lugs 11 are formed and in the lower region 12 arm supports 13 are formed. With this "steering wheel" 1 the driver can support himself comfortably as with particular forms of bicycle handlebar, which counteracts fatigue on longer journeys and makes possible a particularly relaxed sitting posture. Especially in the central part 9, an airbag 14 and actuating and display devices 15 to 17 are accommodated. In the left-hand part of the "steering wheel" 1 for example a keypad 15 is provided for specifying a particular vehicle speed, a lever 15a is provided for actuating the travel direction display, a key 15b is provided for the input of further commands and a further key 15c is provided for tuning the radio. In the right-hand part, a keypad 16 is provided for setting the air-conditioning, a lever 16a is provided for actuating the travel direction display, a key 16b for the input of further commands and a key 16c is provided to actuate the horn. All the actuating devices are arranged so that they can be reached without the hand having to be removed from the "steering wheel" 1. In the upper region, between the keypads 15 and 16, a display device in the form of a multifunction display can be additionally arranged, via which the driver can be presented automatically, or on request, with all possible information concerning the vehicle in a visually perceptible manner.

As the energy and data transmission between the vehicle body and the "steering wheel", which is rotatable only through ±30 degrees of angle, presents no technical difficulties of any kind, of course substantially more display and actuating devices can be further accommodated on the "steering wheel" 1, without the risk of an overloading in this respect. Hence, almost all the actuating devices necessary for operating a vehicle can be accommodated directly on the steering wheel, which contributes considerably to the driving safety, because for these purposes the driver now no longer has to let go of the steering wheel. The arrangement of arm supports 13 shows furthermore that the "steering wheel" according to the invention can also undertake totally new functions which were not possible hitherto.

This also applies if instead of a path-proportional measured value transmitter, a force-proportional measured value transmitter is used.

What is claimed is:

1. A steering wheel device for a motor vehicle comprising:

an actuating member for introducing a steering movement, a steering linkage to transfer said steering movement to steerable vehicle wheels, an adjustment drive, and an electrical regulating device, said actuating member comprising:

a steering wheel having a central axis of rotation and an upper region above said axis of rotation and a lower region below said axis of rotation, and a measured value transmitter for generating an electrical position signal, said steering linkage being actuated by said electrical regulating device as a function of said position signal, said steering wheel being rotatable against a restoring spring through a maximum of ±10° around said axis of rotation from a central position, said steering wheel comprising a central part, on which in said upper region above said axis of rotation grip lugs are constructed, and in said lower region below said axis of rotation arm supports are constructed, said arm supports being protrusions extending outward from said central part, said arm supports having free ends terminating at a distance spaced apart from said grip lugs, said free ends not being connected to any part of the steering wheel.

2. The steering device according claim 1, wherein a display device (17) is provided in the steering wheel, which indicates to the driver the position of the steering wheel (1).

3. The steering device according to claim 1, wherein the grip lugs (11) and the arm supports (13) are constructed in one piece with the central part (9).

4. The steering device according to claim 1, wherein an airbag (14) and actuating and display devices (15 to 17) are accommodated in the steering wheel (1).

5. The steering device according to claim 1, wherein the actuating devices (15, 16) are additionally arranged in the grip region (7) or in the region of the grip lugs (11).

* * * * *